US005093141A

United States Patent [19]
Németh et al.

[11] Patent Number: 5,093,141
[45] Date of Patent: Mar. 3, 1992

[54] PRODUCT AND PROCESS FOR PRODUCTION OF ALCOHOL-FREE WINES OR ALCOHOL REDUCED WINES AND BRANDY

[75] Inventors: László Németh; Béla Jóvér; Sándor Doleschall; Génza Pap; Gyula Gáti, all of Budapest; István Juhász; Imre Sápi, both of Százhalombatta; Sándor Kovacs, Kiskunhalas; Gizella C. Horváth, Kiskunmajsa, all of Hungary

[73] Assignees: Magyar Szenhidrogenipari Kutato-Fejleszto Intezet, Szazhalombatta; Jonathan MgTsZ, Kiskunmaisa, both of Hungary

[21] Appl. No.: 525,036

[22] Filed: May 18, 1990

[30] Foreign Application Priority Data

| May 23, 1989 | [HU] | Hungary | 2570/89 |
| Jun. 29, 1989 | [HU] | Hungary | 2570/89 |
| Aug. 7, 1989 | [HU] | Hungary | 2570/89 |

[51] Int. Cl.$^5$ .................................................. C12G 3/08
[52] U.S. Cl. ........................................ 426/493; 426/14; 426/15; 426/494; 203/49; 159/13.1

[58] Field of Search .................. 426/493, 494, 14, 15; 203/49, 89, 91, 236, DIG. 13; 159/13.1, 13.5, 49, 16

[56] References Cited

U.S. PATENT DOCUMENTS 4,405,652 9/1983 Boucher ............................... 426/14
4,626,437 12/1986 Schobinger et al. ................ 426/493

OTHER PUBLICATIONS

Amerine et al. 1972, Technology of Wine Making, Avi Publishing Co., p. 550.

*Primary Examiner*—Donald E. Czaja
*Assistant Examiner*—Helen Pratt
*Attorney, Agent, or Firm*—Keil & Weinkauf

[57] ABSTRACT

The invention relates to a process for the production of alcohol-free wine, i. e. wine containing less than 1% by volume of alcohol, and of wines containing reduced concentrations i.e. 1 to 7% by volume of alcohol with the simultaneous production of brandy by using continuous vacuum film distillation with continuous introduction of carbon dioxide and/or an inert gas, producing thereby a dynamic atmosphere of carbon dioxide and/or an inert gas, at the temperature of at most 100° C., preferably 40°–100° C. and in a vacuum of 6.45–25.80 kPa.

12 Claims, 1 Drawing Sheet

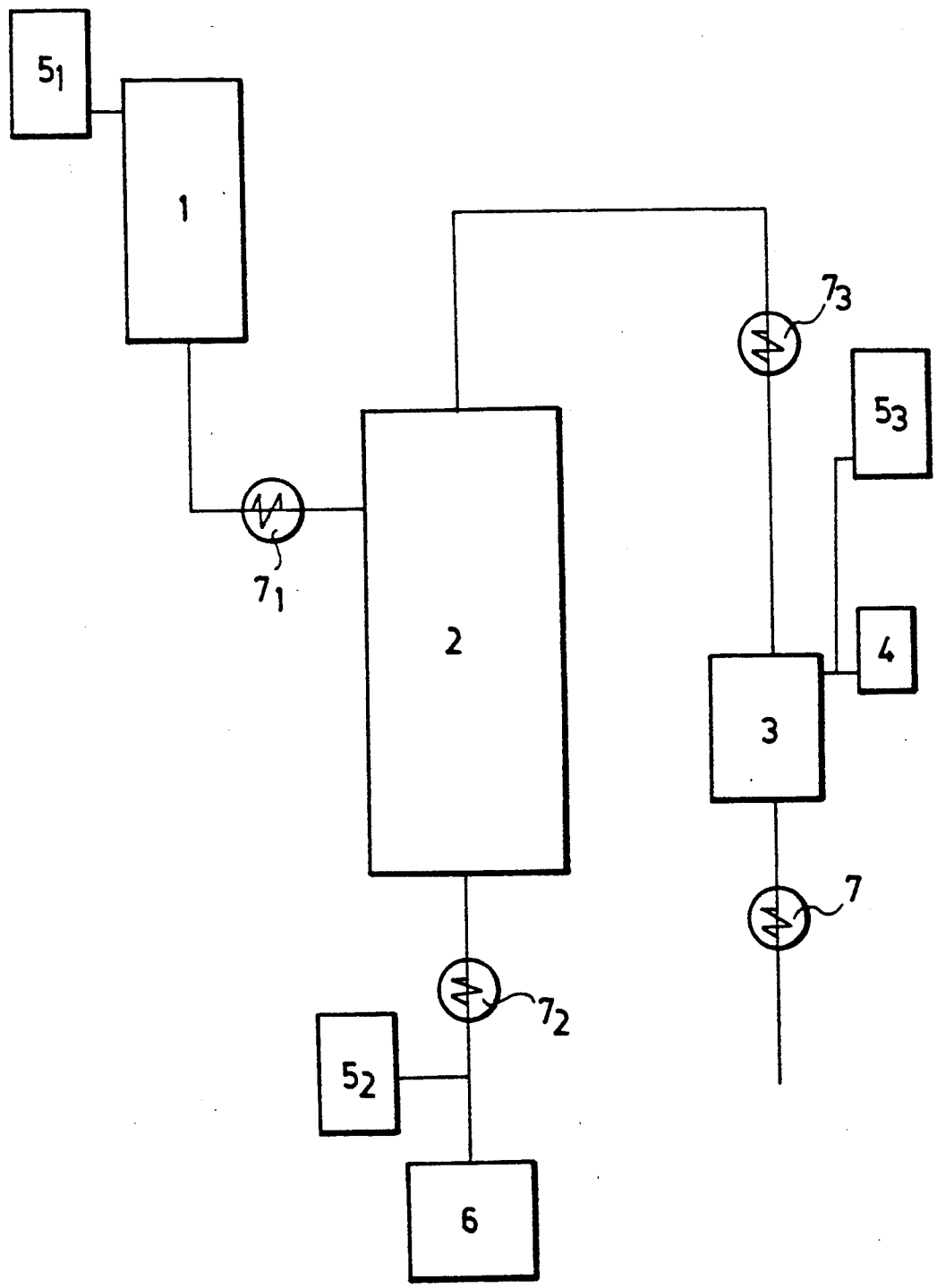

PRODUCT AND PROCESS FOR PRODUCTION OF ALCOHOL-FREE WINES OR ALCOHOL REDUCED WINES AND BRANDY

The invention relates to an improved process for the production of alcohol-free wines with less than 1% by volume alcohol concentration and of wines of reduced alcohol content (1 to 7% by volume alcohol concentration), where the original taste and flavour (bouquet) of the wine used as raw material are preserved essentially without any change and where, as a second product of the process, brandy of fine aroma and of an alcohol content of 25 to 45% by volume is obtained. In the world market there is a rapidly growing demand for wines of low alcohol content (1.0 to 10.0% by volume) and for alcohol-free wines (with an alcohol content less than 1.0% by volume).

Considering the aspects of health preserving and of the safety of driving, the production of alcohol-free wines may be considered as the main advance of the process. Also, due to the prescriptions of the islamic religion there is an immense demand for drinks of low alcohol concentration.

Processes describing the production of wines of low alcohol content by distillation (e.g. the Belgian patent No. 900,359) or by osmotic technics (e.g. the European patent No. 162,240) are known. However, when proceeding according to these processes it is not possible to preserve the original character, the taste, flavour and bouquet of the wines. The alcohol-free wines produced according to the above processes are mixed subsequently with must or grape-juice; practically the product obtained is not the original wine transformed into its alcohol-free variant, but by using the alcohol-free wine as raw material and improving its taste and flavour with the above additives a new drink is produced.

Further, the alcohol content of wines may be reduced by extracting them with liquid $CO_2$ at high pressure (e.g. according to processes described in German patent specifications Nos. 2,902,007 and 3,024,005 respectively). This procedure has a serious disadvantage, namely the alcohol content of the wines can be reduced by using them only to a limited extent.

Taking into account the costs of the investment, the productivity and the economical aspects of the processes, only the distillation seems to be suitable for commercial use. Therefore the aim was set and experiments were carried out for eliminating the disadvantages of the known processes and to produce alcohol-free wines or wines of reduced alcohol content and of suitable flavour by distillation. However, the alcohol-free wines or the wines of reduced alcohol content produced under atmospheric conditions get an unpleasant (acidic) by-flavour and this disadvantage can not be satisfactorily eliminated even by using customary vacuum distillation.

Surprisingly we came to the conclusion that when a continuous inert gas flow, i.e. a dynamic inert gas atmosphere is assured during the vacuum distillation the above described disadvantages of the known vacuum distillation processes can be eliminated. This fact is supposed to be the consequence of the following effects of the dynamic inert gas atmosphere: the relative volatility conditions of the aromatic compounds related to the ethanol-water system are favorably modified and the thermal and oxidative degradation of the flavour compounds is prevented. This favourable effect was observed when nitrogen or helium was used, however, the most preferable results were obtained if using carbon dioxide.

An unexpected more pronounced favourable effect was observed if using the dynamic $CO_2$ and/or inert gas atmosphere already in the wine before its introduction into the vacuum evaporator.

Having studied the effect of the temperature of the film distillator it was observed that when optimizing the temperature opposite effects must be taken in consideration. Using a lower temperature the decomposition of the aromatic compounds is more moderate but the separation of the alcohol from water is not so effective. When the temperature is elevated, the thermal decomposition of the aromatic compounds of the wine is accelerated, moreover the introduced raw material may get burnt on the surface of the heat-exchanger, but at the same time the effect of the separation improves. The increased velocity of the heat-degradation is compensated in certain degree by the greater output of the heat-exchanger, i.e. by the reduction of the retention time of the liquid in the hot zone. The mentioned processes are influenced also by the absolute value of the residual gas pressure.

Summarizing, it may be stated that the optimum values of the parameters of the process of the invention must be always determined in a complex manner with taking into consideration also the quality of the raw material used.

The flash distillation realized according to the invention in a dynamically renovated inert gas atmosphere assures the total preservation of the flavouring materials of the distillate as well as of the slops and at the same time the process may be applied as a large scale technology with very good productivity.

The alcohol-free wines or wines of reduced alcohol content prepared by the process according to the invention may be bottled in se or sugar solution can be added to adjust their sugar content to the desired organoleptic level; or, if desired, they may be saturated with carbon dioxide for obtaining refreshers, or, if desired, 5 to 50 g/l of sugar and some champagne yeast may be added to the wine treated according to the invention and fermentation, disgorging, liqueuring and post-treatment, respectively, are carried out by known method to obtain champagne; the overhead product and the distillate collected in the trap are used to prepare liqueur or brandy.

The scheme of the equipment applied for the realization of the process according to the invention is depicted in FIG. 1.

The principal parts of the equipment are the following:

1. Feedtank and/or apparatus for $CO_2$ or inert gas saturation.
2. Film distillator
3. Receiver of the overhead product
4. Vacuum pump
5. Inlet of $CO_2$ and inert gases
6. Trap (refrigerated)
7. Valves The operation of the equipment is the following: the raw material, i.e. the wine is filled into the feed-tank (1); the valve of the $CO_2$ and/or inert gas inlet ($5_1$) is opened and is connected with the vacuum pump (4). The operation of the cooling and heating system of the film distillator (2) is controlled. When the desired temperature and vacuum are established, the proportioning valve (7)

is opened, and the introduction of the wine is begun. When the process is finished the valves for evacuation of the slop ($7_2$) and of the overhead product ($7_3$) are opened and the obtained alcohol-free wine or the wine of reduced alcohol content as well as the brandy are evacuated. The process of the invention is described in a more detailed manner in the following examples. The examples are of non-limiting character.

EXAMPLE 1

100 l of wine was filled into the feedtank of the equipment depicted in FIG. 1 (its alcohol concentration is 14% by volume) and $CO_2$ was passed through the liquid with a velocity of 42 l/hour. The introduction of $CO_2$ was continued until reaching the pressure of 6.45 kPa in the equipment. The surface of the film distillator was 0.5 $m^2$ and the temperature of the evaporator was 75° C. The velocity of the introduction of wine was 10 l/hour. The temperature of the refrigerated trap was adjusted to 5° C.

As a result of the distillation 60 liters of alcohol-free wine of 0.8% by volume alcohol content were obtained which wine practically preserved the taste of the original wine. The overhead product amounted to 33 liters destillate which contained 29% by volume of alcohol and had a fine flavour. In the trap 5.4 liters of brandy of 49% by volume alcohol content was collected. With combining the overhead product and the distillate received in the trap 38 l distillate of an alcohol content of 32% by volume was obtained. This twin-product of the process is processed by suitable known method to liqueur and brandy distillates of excellent organoleptic value.

EXAMPLE 2

The organoleptic value of the product of low alcohol content and high biological value obtained with the process described in example 1 has been diminished by the relatively high titratable acid content (12–14 g/liter). A D-glucose solution of 80% by weight was prepared and used to adjust the sugar concentration of the product to 45 g/liter. This drink had a very good taste and at the same time it preserved not only the values originally present in it, but it got enriched with a substance of beneficial effect from the aspect of health.

For enhancing the refreshing effect, the product was saturated with $CO_2$. By dissolving 5 g of $CO_2$ per liter drink the organoleptic value of the drink got increased due to the enhancement of the flavour substances.

This method represents an alternative processing possibility taking into account the consumer's requirements.

EXAMPLE 3

Brandy and alcohol-free wine, respectively, were produced by the method described in example 1.

For increasing the organoleptic value of the product to the wine containing 0.8% by volume of alcohol 25 g/liter of sugar was added then it was inoculated with Hefix-500 (dried preparation of Saccharomyces cerevisiae, var. ellipsoideus, one of the subspecies used for champagne production, the product of EBSTRÖ). The fermentation lasted for 2 weeks in closed bottles. The produces lees were separated and removed from the bottles by usual method. The drink obtained after disgorging, rich in carbonic acid was liqueured and closed again after disgorging.

The alcohol content of the finished product was 2.8% by volume. The organoleptic value of the product was excellent, its colour was not distinguishable from that of the traditional products of high alcohol content.

EXAMPLE 4

The process according to Example 1 was repeated with the difference that:
a) the distillation was continued only until the alcohol content of the wine serving as raw material was diminished to 1 to 7% by volume or
b) to the wine obtained, having an alcohol content of 1% by volume was given the sufficient amount of pure alcohol or destillate obtained in previous distillations to increase the alcohol concentration of the product to the desired level of 1 to 7% by volume.

This product is a drink having the same flavour as the original wine used as raw material and possessing a complete organoleptic value.

EXAMPLE 5

The process according to Example 2 was repeated with the difference that a wine of 1 to 7% by volume alcohol content was used as raw material.

EXAMPLE 6

The process according to Example 3 was repeated with the difference that a wine of 1 to 7% by volume alcohol content was used as raw material and 5 to 15 g of sugar was added per liter drink, then it was inoculated with a yeast serving for champagne production.

EXAMPLE 7

100 l wine of an alcohol concentration of 14.8% by volume was introduced into the feedtank of the equipment depicted in FIG. 1 and a flow of 42 l/h of nitrogen was passed through the wine. The pressure of the evaporator was adjusted to 6.67 kPa. The area of the surface of the evaporator was 0.5 $m^2$, the temperature of the same was 75° C. and the velocity of the introduction of the wine was 10 l/hour. The temperature of the refrigerated trap was 5° C.

After having finished the dealcoholization we have obtained 60 liters of alcohol-free wine of 0.8% by volume alcohol content having practically the same bouquet as that of the original wine. The overhead product amounted to 33 liters of distillate of 29% by volume alcohol content having fine flavour. In the trap 5.4 liters of distillate of 49% by volume alcohol content was gathered. After having united the distilled products, i.e. the overhead product and the contents of the trap, 38 liters of brandy containing 32% by volume of alcohol was obtained. This twin-product of the process can also be used after a suitable processing.

We claim:

1. A process for the simultaneous production of alcohol-free wine, having an alcohol content of less than 1% by volume, and an alcohol-containing brandy from wine by continuous film-evaporation which comprises: feeding the wine, which is continuously supplied with an inert gas atmosphere, into a film-evaporation distillation unit, which is kept under a dynamic inert gas atmosphere of 6.45 to 25.80 kPa, distilling the wine under the inert gas atmosphere at a temperature of from 60° to 100° C. until the wine in the distillation unit has an alcohol content of less than 1% by volume, collecting an overhead product from the distillation unit and a distillate collected in a trap from the bottom of the distillation unit and combining them to constitute said alcohol-containing brandy and obtaining said alcohol-free wine in the distillation unit.

2. The process of claim 1 wherein the inert gas used is $CO_2$.

3. The process of claim 1 wherein the distillation temperature is 60° to 90° C.

4. The process of claim 1 wherein the distillation temperature is 65° to 86° C.

5. The process of claim 1 further comprising elaborating the brandy to produce a liquer.

6. The process of claim 1 wherein the distillation pressure is 6.45 to 23.22 kPa.

7. The process of claim 1 which further comprises bottling the alcohol-free wine directly obtained from the distillation unit.

8. The process of claim 1 further comprising adding a sugar solution to the alcohol-free wine obtained from the distillation unit in order that its sugar content reaches an effective organoleptic level.

9. The process of claim 1 further comprising saturating the alcohol-free wine obtained from the distillation unit with $CO_2$.

10. The process of claim 1 further comprising preparing champagne from the alcohol-free wine by adding 5 to 50 grams of sugar per liter of alcohol-free wine and a fermentation effective amount of champagne-producing yeast to the alcohol-free wine and then fermenting, disgorging, liquering and post-treating the mixture to obtain champagne.

11. The process of claim 1 further comprising adding the original feed wine, pure ethanol or obtained brandy to the alcohol-free wine in an amount to increase its alcohol content to 1 to 7%.

12. A process for the simultaneous production of alcohol-free wine, having an alcohol content of 1 to 7% by volume, and an alcohol-containing brandy from wine by continuous film-evaporation which comprises: feeding the wine, which is continuously supplied with an inert gas atmosphere, into a film-evaporation distillation unit, which is kept under a dynamic inert gas atmosphere of 6.45 to 25.80 kPa, distilling the wine under the inert gas atmosphere at a temperature not exceeding 100° C. until the wine in the distillation unit has an alcohol content of 1 to 7% by volume, collecting an overhead product from the distillation unit and a distillate collected in a trap from the bottom of the distillation unit and combining them to constitute said alcohol-containing brandy and obtaining said alcohol-free wine in the distillation unit.

* * * * *

UNITED STATES PATENT AND TRADEMARK OFFICE
CERTIFICATE OF CORRECTION

PATENT NO. : 5,093,141

DATED : Mar 3, 1992

INVENTOR(S) : NEMETH et al.

It is certified that error appears in the above-identified patent and that said Letters Patent is hereby corrected as shown below:

Column 4, Line 63:
   That part reading "from 60° to" should read -- from 40° to --

Signed and Sealed this

Fifteenth Day of June, 1993

Attest:

MICHAEL K. KIRK

Attesting Officer

Acting Commissioner of Patents and Trademarks